United States Patent
Stradley

(10) Patent No.: US 10,491,979 B1
(45) Date of Patent: Nov. 26, 2019

(54) ELECTRONIC TALKING STICK

(71) Applicant: Suzanne Stradley, Palm Desert, CA (US)

(72) Inventor: Suzanne Stradley, Palm Desert, CA (US)

(*) Notice: Subject to any disclaimer, the term of this patent is extended or adjusted under 35 U.S.C. 154(b) by 0 days.

(21) Appl. No.: 16/230,128

(22) Filed: Dec. 21, 2018

Related U.S. Application Data

(63) Continuation-in-part of application No. 16/036,450, filed on Jul. 16, 2018, which is a continuation-in-part of application No. 15/987,173, filed on May 23, 2018.

(51) Int. Cl.
| | |
|---|---|
| *H04R 1/04* | (2006.01) |
| *G06F 1/16* | (2006.01) |
| *H02J 7/00* | (2006.01) |
| *G06F 1/3212* | (2019.01) |

(52) U.S. Cl.
CPC ............ *H04R 1/04* (2013.01); *G06F 1/1632* (2013.01); *G06F 1/1698* (2013.01); *G06F 1/3212* (2013.01); *H02J 7/0027* (2013.01)

(58) Field of Classification Search
CPC ....................................................... H04R 1/04
USPC ............................................................ 455/420
See application file for complete search history.

(56) References Cited

U.S. PATENT DOCUMENTS

2012/0226997 A1* 9/2012 Pang .................... H04L 65/4038
715/753

* cited by examiner

*Primary Examiner* — Chuck Huynh
(74) *Attorney, Agent, or Firm* — Donald R. Boys; Central Coast Patent Agency LLC

(57) ABSTRACT

An electronic talking stick system has a hand-held electronic talking stick having a body with an outer casing, a microprocessor executing coded instructions, a data repository, an electronic timer, a display screen, a microphone, a mechanism generating alerts to a user at specific times according to the electronic timer, wireless communication circuitry, and a power supply powering electrical and electronic components, and a smartphone comprising wireless communication circuitry compatible with the wireless communication circuitry of the hand-held electronic talking stick, and a microprocessor executing an application for managing functionality of the hand-held electronic talking stick.

14 Claims, 15 Drawing Sheets

ELECTRONIC TALKING STICK

CROSS-REFERENCE TO RELATED DOCUMENTS

The present invention is a Continuation-in-Part of co-pending U.S. patent application Ser. No. 16/036,450, filed on Jul. 16, 2018, which is a Continuation-in-Part of application Ser. No. 15/987,173, filed on May 23, 2018 and entitled "Electronic Talking Stick". Disclosure of the parent application is incorporated herein at least by reference.

BACKGROUND OF THE INVENTION

1. Field of the Invention

The instant invention is in the technical are of hand-held electronic devices, and in one embodiment comprises circuitry of a microphone

2. Description of Related Art

In native-American history there is known use of a decorated object, in some instances a branch or stick, that is passed between participants of a conference or discussion, which is used to pass along permission to talk, and the object is called a talking stick. The person to whom the talking stick is passed has the floor, so to speak, until the talking stick is passed to another. Use of a talking stick has progressed to the present day and is an effective means to control interaction among a group of people who wish to express opinions.

One problem with the conventional, historic talking stick stems from the very familiar circumstance that, in any discussion, there always seems to be one person, at least, that tends to dominate the discussion. Since the permission to speak doesn't pass until the stick passes, this can be a problem.

The problem mentioned above regarding tendency of one person to dominate a discussion is not limited to meetings in which people interact in person, but also occurs in telephone conferences and video conferences of all sorts; anywhere that a select group of people interact verbally on any subject.

What is clearly needed is an electronic talking stick that may be used to manage interaction among participants in a discussion, that has considerable additional functionality. The functionality of such an electronic talking stick also needs to be extended virtually to telephone and video conferences, as well as to online chat/call applications such as Skype™, Joinme™, Google Hangouts™, Zoom™, and others.

BRIEF SUMMARY OF THE INVENTION

In one embodiment of the invention an electronic talking stick system is provided, comprising a hand-held electronic talking stick having a body with an outer casing, a microprocessor executing coded instructions, a data repository, an electronic timer, a display screen, a microphone, a mechanism generating alerts to a user at specific times according to the electronic timer, wireless communication circuitry, and a power supply powering electrical and electronic components, and a smartphone comprising wireless communication circuitry compatible with the wireless communication circuitry of the hand-held electronic talking stick, and a microprocessor executing an application for managing functionality of the hand-held electronic talking stick.

In one embodiment execution of the application on the smartphone generates interactive displays on the display screen of the smartphone enabling a user to set and edit a time to talk for a participant in a conference, to set and edit a caution alert time, to enter topics for conferences to be conducted, and to enter time limits for individual conferences. Also, in one embodiment the system further comprises a removable memory card docked in a card bay, wherein speech of users through the microphone is recorded on the removable memory card. In one embodiment an interactive display provided on the smartphone display by the execution of the application enables wireless connection to different ones of a plurality of electronic talking sticks. And in one embodiment one or more interactive displays enable the user to configure individual ones of a plurality of conferences, setting topics, talk times, alert times, and conference times durations.

In one embodiment of the invention one or more interactive displays enable the user to edit topics, talk times, and alert times for individual ones of the plurality of conferences. Also, in one embodiment, the power supply is a rechargeable battery, and the system further comprises a docking bay into which an electronic talking stick may be docked, the docking bay and the electronic talking stick having pins and sockets enabling docking, and wherein the docking bay, with an electronic talking sick docked, recharges the battery of the electronic talking stick. Also, in one embodiment the system further comprises a speaker in the docking bay and wireless communication circuitry compatible with the wireless communication circuitry of the electronic talking stick, wherein speech of users through the microphone is broadcast by the speaker in the docking bay. In one embodiment the system further comprises lights enabled to light with different colors, and a mechanism enabled to emit an audible signal, wherein alerts may be either an audible signal generated or a light lit in a particular color. And in one embodiment, as the timer times down from the time to talk, the light is lit as green as timing begins, changes to yellow at the caution alert time, and to red at the end of the time to talk.

In one embodiment of the invention the display screen, during a conference wherein a participant is holding the electronic talking stick, displays at least the topic for the conference, and the time counted down by the timer. Also, in one embodiment, the display screen additionally displays one or more of power status, battery level, wireless connection status, speaker status, recording status and data capacity remaining. Also, in one embodiment, interactive displays enable a user to configure individual conferences by entering participants names or other unique identification, and an order for speaking and passing the electronic talking stick. And, in one embodiment, the system further comprises archiving activity of a conference, including participation and speech of individual participants.

In one embodiment the system further comprises facility for preparing and publishing conference reports. In one embodiment the system further comprises facility for a conference participant to request additional time to talk. And in one embodiment a participant granted additional time to talk gives up time to talk in additional rounds of the conference.

DETAILED DESCRIPTION OF THE INVENTION

Figure 1:
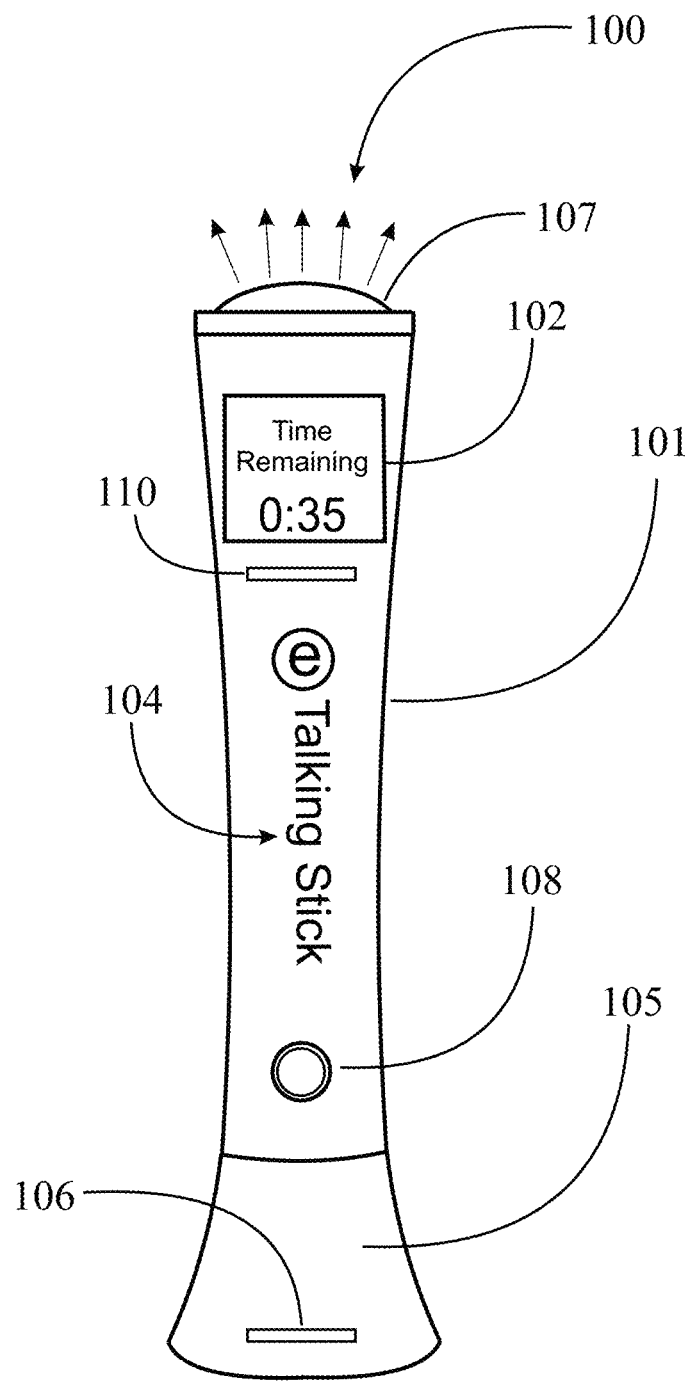
FIG. 1 is an elevation view of an electronic talking stick in one embodiment of the present invention.

FIG. 1 is an elevation view of an electronic talking stick 100 in an embodiment of the present invention. Electronic talking stick 100 in this example is a hand-held device having a housing 101 with an elongated shape that has a circular cross-section, although the circular cross section is not a limiting concept in the invention. The circular shape is convenient to make the electronic talking stick comfortable to hold in one hand.

In this example electronic talking stick 100 has a timer implemented inside housing 101, the timer communicating with a display 102, that in one instance displays time remaining to speak for a person holding the electronic talking stick. Display 102 may be LCD, LED or any other technology that is appropriate.

In one embodiment the display screen is an LCD screen that displays the time remaining for the speaker, and additionally the main topic of a current conference, Bluetooth connection status, speaker status, recording status, and battery level. In various embodiments initial and default settings may be managed through an application executing on a smartphone or other computerized appliance, paired by Bluetooth™.

The electronic talking stick has a base portion in this example with a planar underside, so the electronic talking stick may be set on a table surface. There is an on/off button 108, which may, in some embodiments be a slider switch or rotary switch, and, in some embodiments, an optional USB port 106, although some embodiments do not employ USB.

In addition, there is, in this example, a lighting system 107 that in some embodiments may emit green, yellow and red light. The lighting elements may take any one of several forms, such as LED or neon, and may be provided in different shapes, and in different places on the device in alternative embodiments. There may or may not be a logo 104 on the electronic talking stick.

In some embodiments there may be a memory card, such as a micro-SD card, with a port 110 for docking the memory card. The device has the ability to record the audio picked up by the microphone to the micro-SD card. The card can be easily inserted and accessed from slot 110 in the side of the device next to the screen. Recording settings can be changed through the application to enable/disable this feature. An indicator on the LCD screen shows whether the device is recording or not.

Figure 2:
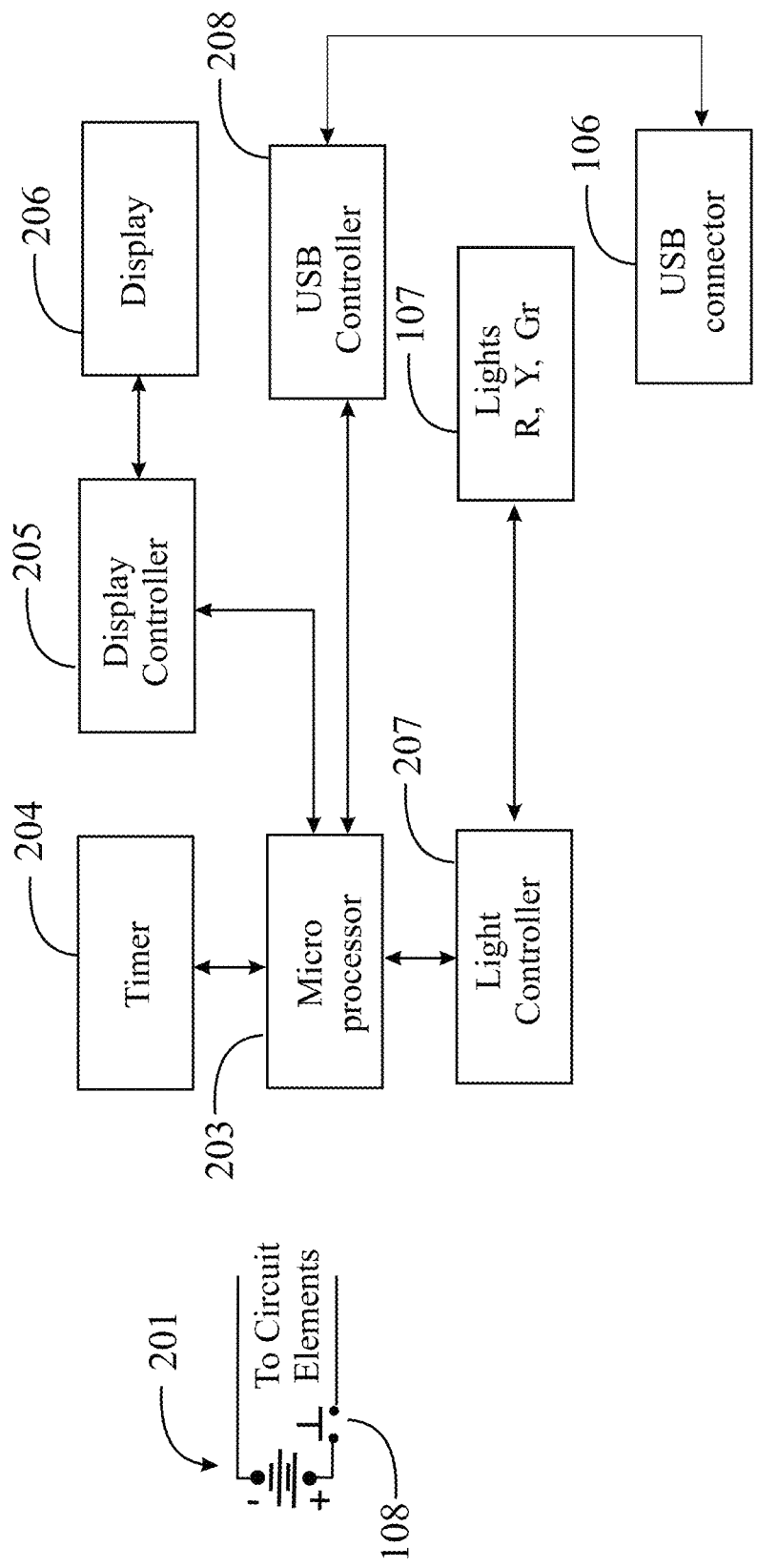
FIG. 2 is a simplified diagram of electronic circuitry for the electronic talking stick of FIG. 1.

FIG. 2 is a somewhat simplified exemplary circuit diagram for electronic talking stick 100 of FIG. 1. The electronic talking stick in the embodiment of FIG. 1 is powered by a battery 201, which supplies power to electronic elements through on/off switch 108. Switch 108 is shown in this example as a push-button switch, and in this embodiment requires functionality, but familiar to those with skill in the art, to render the switch activity as a toggle, such that pressing once may turn power on to the electronic elements, and a second press turns power off. In alternative embodiments the on/off switch may take other forms, such as a toggle or a rotary switch, and in alternative embodiments the button may be located elsewhere on the body of the device.

Battery 201 may be a rechargeable battery, which may be recharged by a DC input at a port not shown, but well-known in the art, and in some circumstances may also be charged through the USB port and circuitry. In some implementation power may be by replaceable batteries, such as AA batteries, in which case there is a battery bay and closure to facilitate battery replacement.

In this example order of functions is controlled by a microprocessor 203, which is programmed for the functionality. In other embodiments the control may be through a programmable chip or firmware device. In one embodiment there is a USB connector 106 through a USB controller 208, to the microprocessor, through which, connected to a computerized device, executing a compatible application, programming of the microprocessor may be established and amended, including settings for thresholds. A USB controller is shown connected to microprocessor 203 and to USB connector 106.

In one embodiment, when power is applied by switch 108, microprocessor 203 resets a timer 204, which begins to count down from a preprogrammed time period, which is synonymous with an agreed-to time to talk in a meeting or conference. This time to talk may be hard-programmed, or in some embodiments may be adjustable for a particular meeting or purpose. At the same initiated time microprocessor 203 controls a light controller 207 to emit green light for light 107 in FIG. 1.

One may assume that when on/off switch 108 is activated, providing power to the microprocessor and other electronic elements, that the electronic talking stick may have been passed to a new participant in a meeting or conference, and that receiving participant has activated the electronic talking stick. According to known rules the receiving person may now start talking and hold the floor for the agreed-to time period. Also, when power is applied, microprocessor 203 signals a display controller 205 which controls display 102 of FIG. 1. In one circumstance the display may immediately render the agreed-to time period for each participant to talk, and then count down in seconds.

For exemplary purpose, assume that the agreed-to time to talk is five minutes. In this example timer 204, once activated, counts down in seconds from five minutes, and light 107 is green, indicating that the speaker is well within the agreed-to time to talk. Display 102 indicates time remaining, counting down.

There may be a pre-set time to indicate to the speaker, and to others in a meeting, that the speaker is near the end of the time to talk, in this case five minutes. At 30 seconds remaining, microprocessor 203 may signal light controller 207 to change the light from green to yellow. In another embodiment, the green light goes off at one minute before the end of the time period, and the yellow light comes on with 30 seconds to the end. The yellow light indicates to the speaker, and other participants, that time is close to expiration. The yellow light remains in effect until time expires, at which time microprocessor 203 signals light controller 207 to turn light 107 to red. The red light indicates to the speaker and other participants that the time to speak for the current speaker has expired.

When the red light comes on, agreed-to behavior is that the current speaker yields to a next speaker. The current speaker may activate switch 202, which operates as a toggle, to turn power off to the electronic elements, at which time the timer resets and light 107 is extinguished. Display controller 205 may also turn off display 102.

At the end of time to speak for one speaker, the electronic talking stick is to be passed to a next speaker. The next speaker, if the next earlier speaker turned off the electronic talking stick, may activate switch 108 to restart the timing, display, and lighting process. If the previous speaker did not turn off the electronic talking stick, the next speaker may do so, and then reactivate to begin speaking.

In this simple embodiment the electronic talking stick performs the functions of an historic talking stick, with additional functionality of displaying time to talk, and a light or other alert functionality with go, caution and stop indication, with additional functionality to reset and reply the process for each new speaker.

As described, the purpose of the lights 107, or other alerts, is to notify the speaker and to other participants. In alternative embodiments alerts may be audible alerts rather than lights, or in addition to lights. For example, in one embodiment, at the 30-second mark before time expires, the electronic talking stick may emit an audible tone, or even a verbal phrase. Vibration may be used as well. Alerts then may be any combination of lights, audible signals, or vibration.

Figure 3:
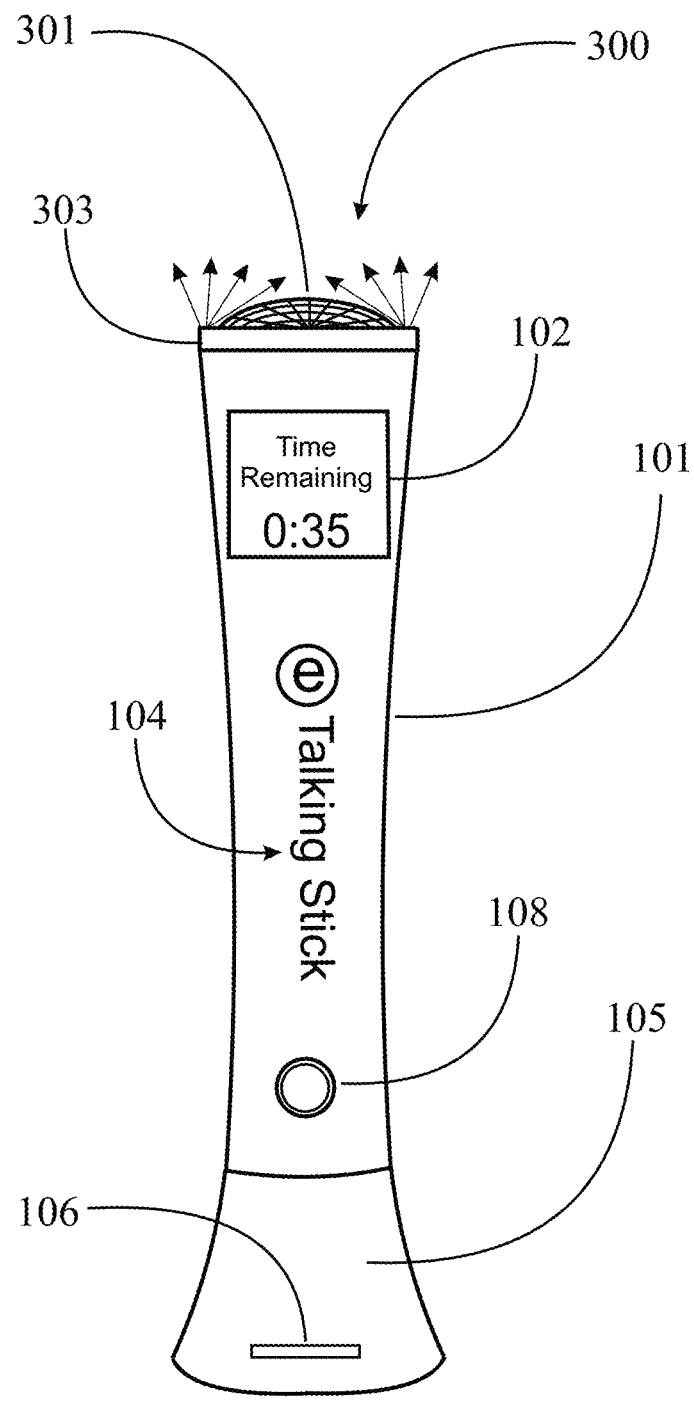
FIG. 3 is an elevation view of an electronic talking stick in an alternative embodiment of the invention.

FIG. 3 is an elevation view of an electronic talking stick in an alternative embodiment of the invention. In talking stick 300 of FIG. 3, many of the elements and functions described above with reference to FIGS. 1 and 2 may be repeated, and elements may bear the same element numbers as in the device of FIG. 1.

A significant difference between the electronic talking stick 100 of FIG. 1, and the electronic talking stick 300 of FIG. 3, is inclusion of a microphone having an audio input interface 301. Electronic talking stick 300 has all of the elements and functionality described above for electronic talking stick 100, plus functionality of a microphone for receiving audio speech of a person holding or using the electronic talking stick and transmitting that speech to an internal or external amplification and speaker system. In this instance, the speaker interface may be in the position of the lights in FIG. 1, but in FIG. 3 the lights may be from a light ring 303 surrounding the microphone interface.

Figure 4:
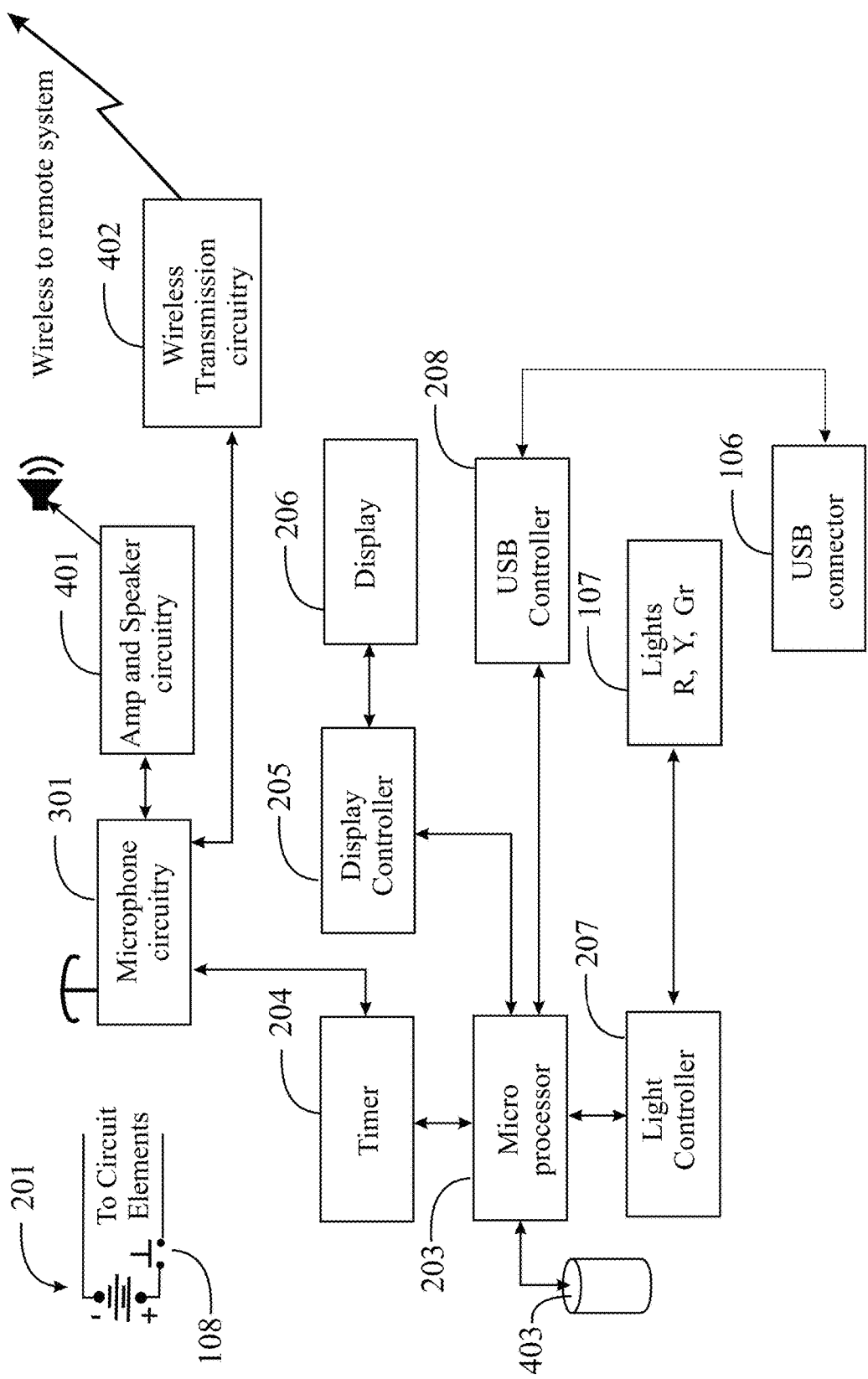
FIG. 4 is a diagram similar to that of FIG. 2, showing the elements of FIG. 2 and additional elements in an embodiment of the invention.

FIG. 4 is a block diagram similar to that of FIG. 2, showing the elements of FIG. 2, microphone and circuitry 301, and an internal amplifier and speaker 401. A near-field wireless communication circuitry 402 is shown as well, which may in some instances be Bluetooth™, which is functional to transmit audio data from microphone 301 to a system, not shown, external to the electronic talking stick. It should be understood that both the internal speaker and the external functionality may be present in the same implementation, but not necessarily so. One or the other may be present.

FIG. 4 also illustrates a data repository 403 coupled to microprocessor 203. In some embodiments repository 403 may store code to execute and data for functionality of the electronic talking stick. Such code a data may be amendable by a user through the USB system. In other embodiments speech may be recorded into repository 403 and speech data may be retrievable through USB port 106. The data repository in some embodiments may also store recorded messages that may be played through speaker circuitry 401, or even through external systems via transmission circuitry 402.

In some other aspects of the invention significant additional functionality is provided through external systems that may be reached through wireless transmission circuitry 402. One example is ability to pair with an external Bluetooth™ speaker system, so that a person using the electronic talking stick may have his/her speech provided through the external speaker, for benefit of all participants in a meeting or conference.

Figure 5:
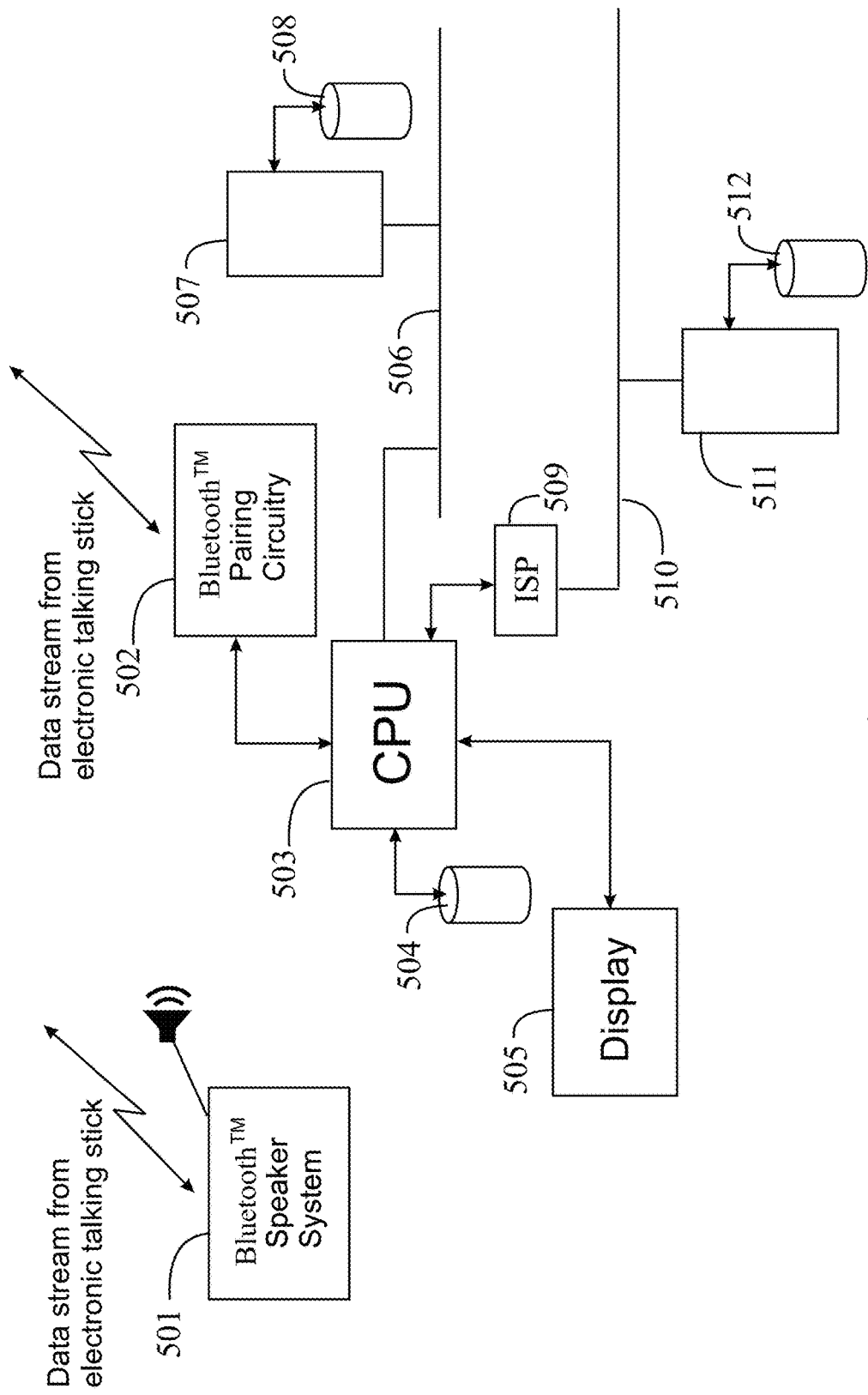
FIG. 5 is a block diagram illustrating optional elements in systems external to the electronic talking stick, that may be employed for additional functionality in an embodiment of the invention.

FIG. 5 is a block diagram illustrating optional elements in systems external to the electronic talking stick, that may be employed for additional functionality in concert with use of the electronic talking stick. As one example, Bluetooth™ speaker system 501 may pair with the electronic talking stick, and broadcast speech from a user of the electronic talking stick. System 501 may be, in some implementation a single speaker in a location that audio is close to the speaker and other participants in a conference or may be a more sophisticated system comprising several speakers in an upscale sound system.

In another implementation a computerized system controlled by a CPU 503 may receive signals through Bluetooth™ pairing circuitry 502 and store audio files in data repository 504. In one implementation, as each participant speaks, audio is recorded, and an audio file is implemented and saved as a separate file each time a user turns the electronic talking stick off to pass to another speaker. This action, as described above, may be a simple reset of the circuitry of the electronic talking stick.

In another embodiment, as a user is speaking into the electronic talking stick, CPU 503 may be functional to perform voice-to-text on the audio input and display the text in near real time on a display 505, which may be visible to the speaker and to other participants. Transcribed speech may also be saved in repository 504 and associated with saved audio for each speaker that used the electronic talking stick. CPU 503 may be, in some embodiments, part of a general-purpose computer system operated by an organization or enterprise with which speakers in a conference are associated, and there may be regular management and reports generated using the saved audio and text, which may be associated with meeting time and day, and purpose for the organization or enterprise.

In other embodiments of the invention CPU 503 may be coupled to a Local area Network (LAN) 506 in an enterprise, and there may be servers represented by server 507 coupled to the LAN, and to data repositories represented by 508. In a dedicated system in an enterprise, like a division of a corporation, employees may have profiles stored in data repositories 508 coupled to servers 507. CPU 503 may be coupled as well, through an Internet Service Provider that may be any one of several devices and protocols, to a wide area network (WAN) like the well-known Internet network, where a great many sites may be connected.

In another embodiment of the invention CPU 503 may be a CPU of a smart telephone, hereinafter a smartphone. The smartphone may pair with the electronic talking stick according to Bluetooth™ protocol, and the CPU may execute coded instructions to program, configure and manage functionality of electronic talking sticks that may be thus paired. Other close-range wireless technologies may be employed as well for communication between an electronic talking stick and a smartphone. Considerable further teaching is provided below with reference to FIGS. 10 through 14 regarding pairing of an electronic talking stick with a smartphone, and processes by which functionality of the electronic talking stick system may be accomplished.

Figure 6:
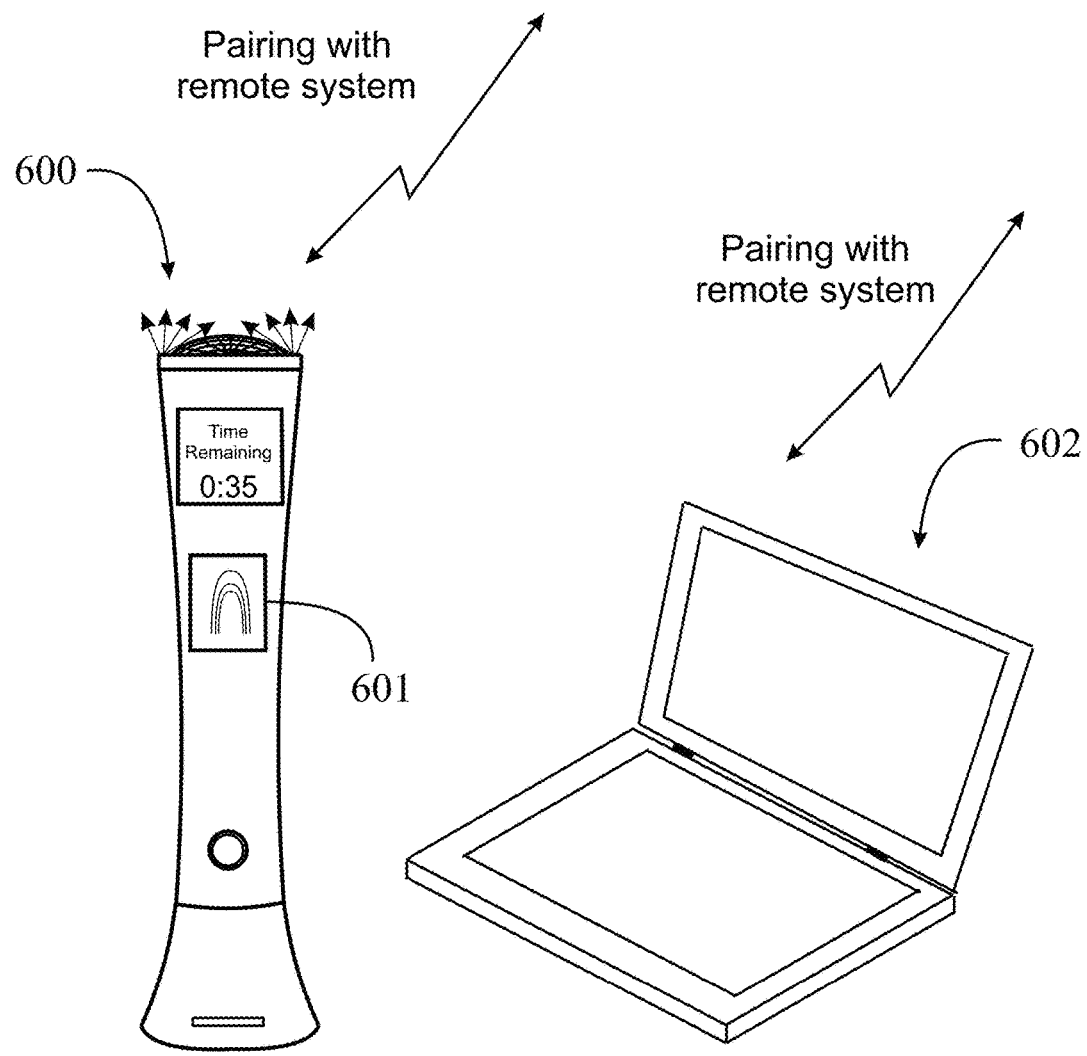
FIG. 6 illustrates an electronic talking stick paired to an external system as illustrated in FIG. 5, and a pad device in an embodiment of the invention.

FIG. 6 illustrates an electronic talking stick 600 paired to an external system as illustrated in FIG. 5, and a pad device 601 also paired with the same external system, external simply meaning outside the circuitry of the electronic talking stick. Electronic talking stick 600 has a biometric input 601, in this example a fingerprint pad, with which a speaker may identify herself to the computerized external system, accessing, for example, data of various sorts that may be stored in that user's profile in, for example data repository 508 coupled to server 507 on LAN 506. It was described above, that in an enterprise setting, employees may have stored profiles with identity, job description, pictures, and data of many sorts. The speaker through such data access may use another device, such as pad device 602, to access and utilize stored data on that user's profile. The speaker may, for example, through an app executing on device 602, cause music or other sound effects to play over the external speaker system in concert with her own speech in real time in a conference. Explosions, drum rolls, music clips and more may be used. The speaker may also display image files on display 505 in concert with speech in real time. All may be recorded as a session for that speaker.

In other embodiments a smart phone or laptop, or other smart device may be used with wireless connectivity to external systems. It should also be noted that biometric input may be voice recognition or another form of bio input, other than fingerprint. Returning to FIG. 5, it may be noted that employees in an enterprise may have computerized platforms connected to or connectable to LAN 506, and these employees may, in some embodiments, access meeting data stored, for example, in repository 504 during or after a meeting. It may be propitious, for example, for a participant in a conference enhanced by use of an electronic talking stick, to access and review what a previous speaker has said, before that participant has the electronic talking stick and permission to speak. An upcoming speaker might well do so through a smart device paired to the external system, during the time of a conference.

In another aspect of the invention, functionality provided by an electronic talking stick, as described in several examples above, is extended to circumstances of groups of people engaged in telephone and video conferences. Such conferences are very well-known in the art, where two or more people are connected through telephone equipment, or through computer systems, to engage in a discussion. As one example, there exist in the art conference systems enabling persons to dial in using any sort of telephonic device, which may be a land-line phone, a cell phone, or a computer VoIP system, like Skype™ for example, and participants who have dialed in then may engage in an audio conference. There are a variety of control schemes in the art by which such conferences may be governed, but, to the inventor's knowledge, none of these impose controls of the sort described above for the electronic talking stick.

Figure 7:
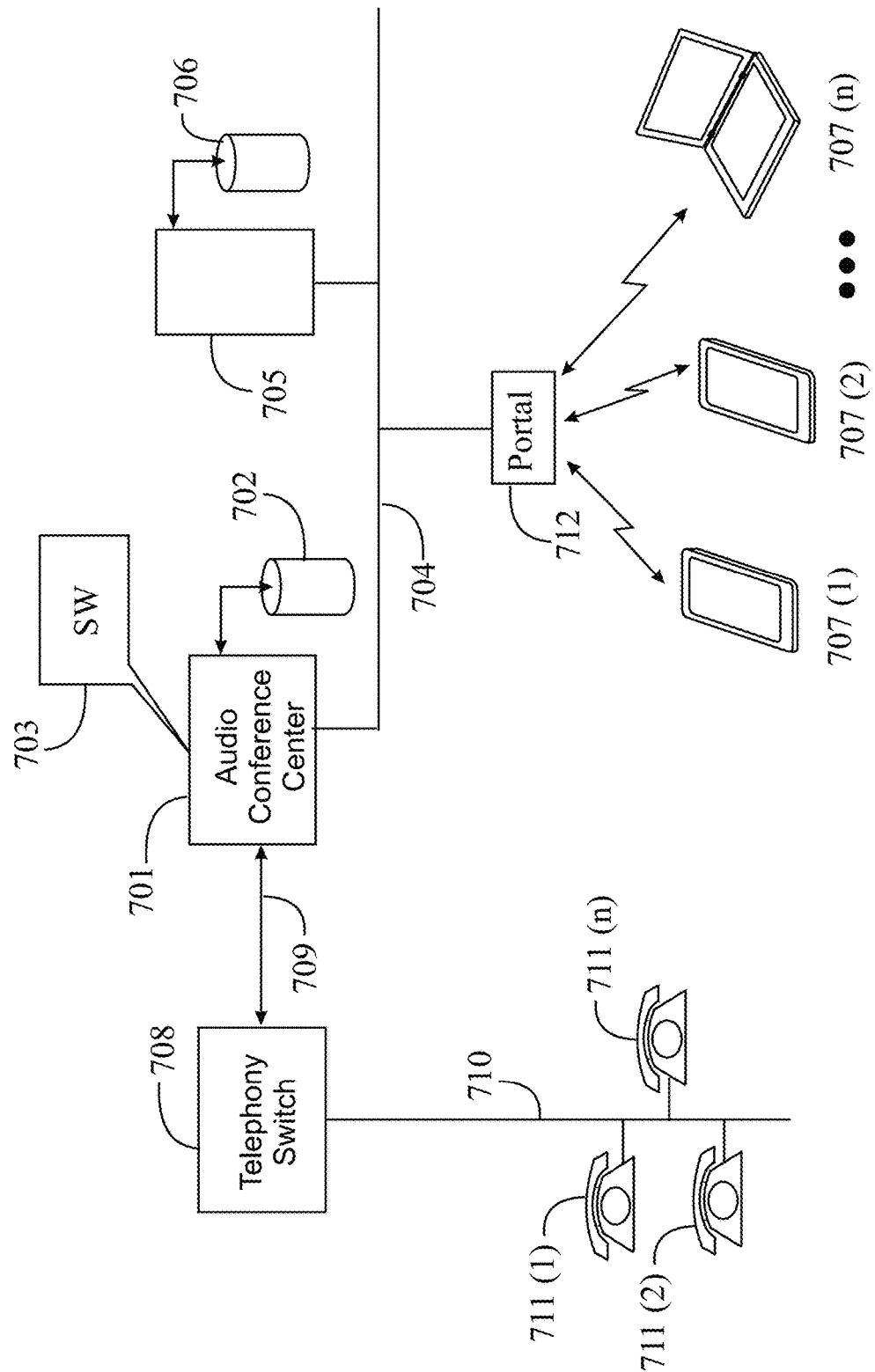
FIG. 7 is an exemplary diagram depicting talking stick functionality in a telephone conference.

FIG. 7 is an exemplary diagram depicting talking stick functionality in an audio telephone conference situation. An audio conference center 701 is a computerized server enabled through software 703 executing on a processor of the server to terminate a plurality of telephone connections and to join groups of connections into conferences. Conference center 701 in this example is connected to a data repository 702 which may store telephone numbers and addresses for individuals engaged or having been engaged in conferences managed by conference center 701.

A telephony switch 708 connected to at least one land-line trunk 710 enables calls initiated from land-line telephones 711(1) through 711(*n*) to connect through a trunk 709 to conference center 701. In addition to the land-line functionality, conference center 701 is also connected to a packet network represented by backbone 704, representing all of the subnetworks and connectivity of, for example, the well-known Internet network. Server 705 with data repository 706, shown connected to the packet network 704 represents one of many third-party enterprises and services that may be connected on the packet network, and that may also interact with conference center 701.

A general portal 712 is shown connected to packet network 704, and devices 707 (1–n) are illustrated as connected through portal 712, enabling users of these devices, through telephony software, to also call in to conference center 701 by voice-over-IP (VoIP) technology, and to be included in conferences managed by conference center 701 by execution of SW 703.

Conference center 701, managed by SW 703, in this example is limited to audio conferences. Many management schemes are known in the art. For example, in one circumstance a conference organizer may configure a conference for a certain future day and time and may select participants for the conference. Telephone numbers or IP addresses may be entered for the participants, or names may be entered or selected from a list of conferees stored in data repository 702. Selected participants may be alerted that they are participants by voice mail, email, or by other communication channel, and at the time of the conference the notified participants may call in and be entered into the conference. In some circumstances the conference center may, at the time of the conference, call individual ones or all of the participants.

Once a conference is initiated and in progress there are a variety of control schemes known in the art. There may, for example, be a conference leader during the conference, which may be the originator of the conference, or another participant, who may be enabled to exert a level of control into issues of who is speaking, who will speak next, how long one may speak, and in some cases that leader may be able to exercise control of muting or completely cutting off a participant.

In embodiments of the present invention conferences may be organized and joined in much the same way as described above, and in other ways known in the art. Control in embodiments of the invention pertain primarily after a conference begins, and during the conduct of the conference. Particular control is exercised to impose the functionality described above for embodiments using an electronic talking stick in discussions.

In audio conferences enabled through conference center 701 the participants are, of course, remote from the conference center, and remote from one another. There is no physical ability to pass an electronic talking stick from one participant to another. The order of speaking, duration imposed, and alerts as to approaching limits, as described above, however, may be imposed on the conferees by SW 703, just as with an electronic talking stick.

In one embodiment, once participants are known, an order of speaking may be imposed. This order may be arbitrary and set by the conference organizer before the conference or may be imposed in real time by the conference leader, either as an order that may be amended during the conference or may be imposed at the end of each dialogue by a participant to pass the talking stick, so to speak, to a next participant.

A duration of time-to-speak may be preset in embodiments of the invention, and a timer begins timing down as each participant starts his or her turn at speaking. In one embodiment, as a participant is recognized to speak, a recorded utterance may be played for that participant. For example, the agreed-to and programmed time-to-talk for each participant may be five minutes, and the announcement to a participant at the beginning of that participant's dialogue may say "Five minutes". Five minutes, or course, is an example, and the time-to-talk may be more or less time.

In some embodiments the announcement at the beginning may be restricted to just the participant enabled to talk. In other embodiments all participants, or a select group, may also hear the announcement.

Once the participant begins speaking, the timer keeps decrementing, and a warning may be set to be announced as the speaker approaches the maximum time to speak, just as described above for the electronic talking stick. The example used above is 30 seconds prior to the maximum time to talk, and that same period suffices in this description. At a time of four minutes and 30 seconds after the present speaker begins, an announcement may be made as an alert, for example "thirty seconds". The speaker then knows he or she has thirty seconds left to speak. A single announcement at thirty seconds to go is, of course, exemplary. There could be a series of announcement as time winds down, at different times.

At the end of the time-to talk, there may be different functionality imposed in different embodiments of the invention. In one embodiment the speaker's ability to be heard by other participants may simply be turned off. The speaker, of course, may continue to speak, but the system may simply pass the talking stick to a next speaker, and start the timer, and make the time announcement to the next speaker. The former speaker may quickly realize that he or she is not being heard in the conference.

The functionality thus far described seems to assume that one speaker will speak for the time-to-speak, before any other participant may be heard. This is not a limitation in embodiments of the invention. It is well-known that in the conference all of the participants will hear the speaker, and in many cases the speaker, who has been afforded a time to speak, is really afforded a time to lead the conversation. The instant speaker in some embodiments, may ask questions or ask for input from other participants, and listen to answers or the other input during his or her timed engagement. But is still terminated or muted at the end of the time-to-speak.

In some embodiments a speaker may be permitted extra time, which may be a pre-programmed feature. The speaker in such a circumstance may be allowed an extra minute or two after expiration of the time-to-speak and will not be cut off immediately. In some embodiments that speaker may be marked by the system as having used, for example, 90 seconds more than the allotted time, and in circumstances wherein the speaking order may be repeated, which may be a typical arrangement in embodiments of the invention, the speaker going over time may be docked the second time around for the extra time used the first time around.

In some embodiments of the invention a speaker may yield his or her time to speak to another participant, and in some embodiments a speaker may request yield time from other speakers, in which case a time-to-speak may be adjusted for different speakers. For example, in one conference several participants may yield one half of their time to another participant, who may accrue extra time thereby, and the yielding speakers time will be docked accordingly. There are many possibilities. A principal and important feature in embodiments of the invention is the imposition of a timer, and announcements, at least to the instant speaker, of time left to speak.

In one embodiment of the invention talking stick functionality is made available as software plug-ins for existing audio conference systems Talking-stick functionality is applicable as well to video conferences, which are well-known in the art, such as provided through third-party vendors like Skype™ and ZOOM™, for example. In video conferences participants have use of computerized platforms that have both an imaging device (a camera) and a screen for displaying images of other participants during participation.

Figure 8:
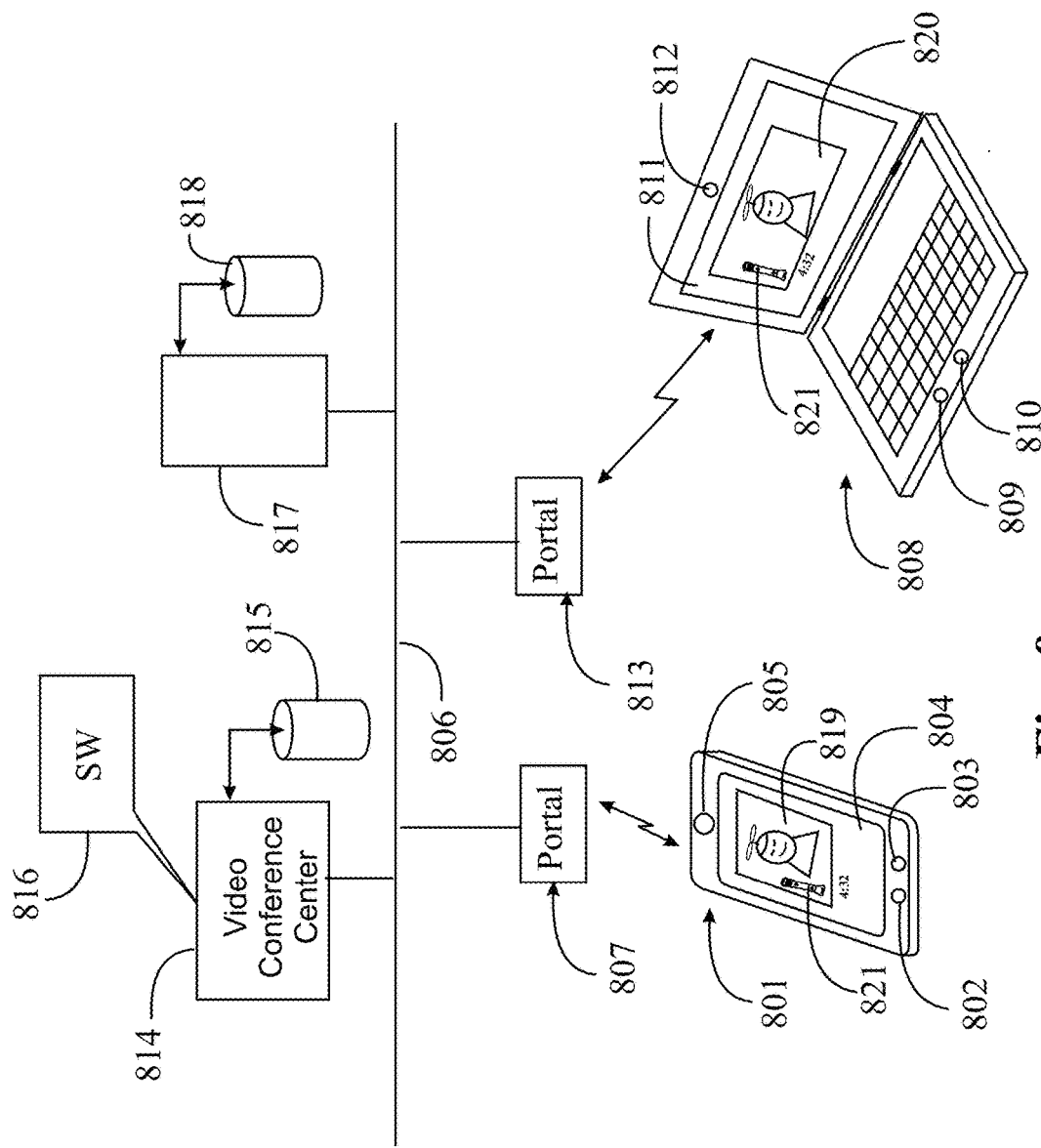
FIG. 8 is an exemplary diagram depicting talking stick functionality in a video conference.

FIG. 8 is a diagram illustrating two participants in a video conference using platforms 801 and 808. In this example platform 801 is a cellular telephone having a microphone 802, a speaker 803, a display screen 804 and a camera 805. Platform 801 connects to Internet backbone 806 through a suitable portal 807, which may, in this instance be a portal in a cellular network.

Platform 808 in this example is a laptop computer having a microphone 809, a speaker 810, a display screen 811 and a camera 812. Platform 808 connects to Internet backbone 806 through a suitable portal 813, which may, in this instance be a WiFi portal.

Video conference center 814 supported on the Internet is a computerized server executing software 816 and connected to a data repository 815. A third-party server 817 with a data repository 818 represents a plurality of such servers known to be connected in the Internet network, capable of providing services.

Both platforms 801 and 808 have I/O ports not shown whereby a user may connect a headset with a mic input, which the user may use in conferencing rather than the external mic and speaker shown in FIG. 8.

Platforms 801 and 808 in FIG. 8 are meant to represent a plurality of platforms used by a plurality of participants in a video conference. There may be many more platforms and participants than the two shown. In an embodiment of the invention a video conference may be configured by an organizer, not shown, just as described above for an audio conference. This may be done in either the audio conference or the video conference instance through a web site provided by SW 703, in the case of audio conferences, or by SW 816 in the case of video conferences.

Once a video conference commences, as is typical of such conferences, a window is displayed on the screens of each of the participants in the conference, and the window typically displays prominently the current speaker. Other participants may be represented by thumbnail icons in a portion of the display screen. A window 819 is shown on the screen of device 801, and a window 820 is shown on the screen of device 808, each with an indication of an image of a speaker.

In many respects, operation of a video conference by conference center 814 of FIG. 8 is very similar to operation of an audio conference by conference center 701 of FIG. 7. An organizer may set up a conference and, in some cases, determine an order of speakers. A topic may be displayed when a conference begins, and in embodiments of the invention a timer is imposed, speakers are timed, and alerts are provided.

In the case of a video conference the indication of timing and alerts may be visual rather than only audio. In one embodiment an image 821 of the electronic talking stick may be displayed on screen 804 or 811 and may be displayed along with the image of the speaker in windows 819 and 820. As a designated speaker takes over, the time-to-speak is displayed, but instead of being displayed in a very tiny window in the image of the talking stick, where participants would likely be unable to read the time, and follow the changes, the time may be displayed on the screen in a font large enough to by readily seen and followed, as shown below the image windows 819 and 820. In some embodiments the time-to-speak at the start may be announced in the video conference, just as was described for the audio conference. In some embodiments, as a speaker starts, the talking stick image may display green at the upper end, just as in the physical cases described above, and the color may change to yellow at a warning time close to expiration of the time-to-speak. This time, in one example, is 30 seconds before expiration. At expiration the color may change to red.

In other embodiments other indicia may be used for alerts and warnings, such as, for example, a declining graph may be displayed on the screen, with a solid time line that gets shorter as time winds down, and the graph line may change color at certain time points to indicate approach of expiration, and expiration.

In audio and video conferences, as well as meetings of persons using a physical talking stick, all speakers may be recorded, audio for audio conferences, and video, such as MP4, for video conferences. Utterances by speakers in a video conference may be rendered as text (transcribed) and saved as well, and audio may be displayed as text in real time, similar to captioning in multi-media presentations. Audio recordings, associated with speakers, both as audio and text may be made available to individual participants or to all participants after a conference is completed. In brief summary, all of the control functionality of the electronic talking stick may be imposed in telephone conferences and in video conferences.

Additional Embodiments and Functionality

It was described above with reference to FIGS. 7 and 8 that functionality of an electronic talking stick according to embodiments of the invention may be provided in audio and video conferencing applications. Some such applications are, for example, Skype™, Joinme™, Google Hangouts™, and Zoom™, but these are just a short list. There are many other such applications available.

In one embodiment of the invention Such functionality in existing applications may be provided by a plug-in application that may be integrated with the SW of an existing conferencing application. In computing technology, a plug-in (or plugin, add-in, addin, add-on, addon, or extension) is a software component that adds specific features to an existing computer program. When a program supports plug-ins, it enables customization. This means that the existing conferencing application must support plug-ins. Common examples are plug-ins used in web browsers to add new features such as search-engines, virus scanners, or the ability to use a new file type such as a new video format. Well-known browser plug-ins include the Adobe Flash Player, the QuickTime Player, and the Java plug-in, which can launch a user-activated Java applet on a web page to its execution on a local Java virtual machine.

In some embodiments of the present invention a plug-in may be installed to an existing conferencing application, such that the plug-in will add all or some of the features and functionality described above for conferencing applications, with reference to FIGS. 7 and 8. In embodiments of the invention providing talking stick functionality by plug-in, the added functionality extends to configuration of conferences, providing for the typical functions of naming participants, dialing participants, and so on, but also configuring before onset of a conference, order of participation, time-to-speak, and various other functions described in further detail below.

In many embodiments of the invention, especially those wherein a physical electronic talking stick has functionality to wirelessly connect with computerized digital equipment, as described above, for example, with reference to FIGS. 4, 5 and 6, functionality may be extended.

As an example of extended features, a near real-time statistical component may be operable, that will track time used by each speaker at each instance of speaking, and any instances of finishing before a deadline, and instances of speaking longer than allotted time. Statistics may be by speaker, and may be by group of speakers, and in some embodiments, reports may be provided for managers and participants. IN some embodiments a configurable component may rate speakers according to statistical performance.

Another extended feature may be translation of verbal input, either in near real time, or as an after-conference feature. Translation SW may be employed, such that verbal input by one participant may be provided to other participants in another language, and in some embodiments in whatever language a participant prefers.

Another extended feature may provide transcription services, such that verbal input may be recorded, for example, and off-line may be transcribed into one or even several different languages. In some embodiments, a transcript of verbal input, using voice-to-text SW, may be provided and displayed in near real time for individual participants, in a display of a platform used by the participant. The language of the transcript may be different than the language of the input.

Figure 9A:
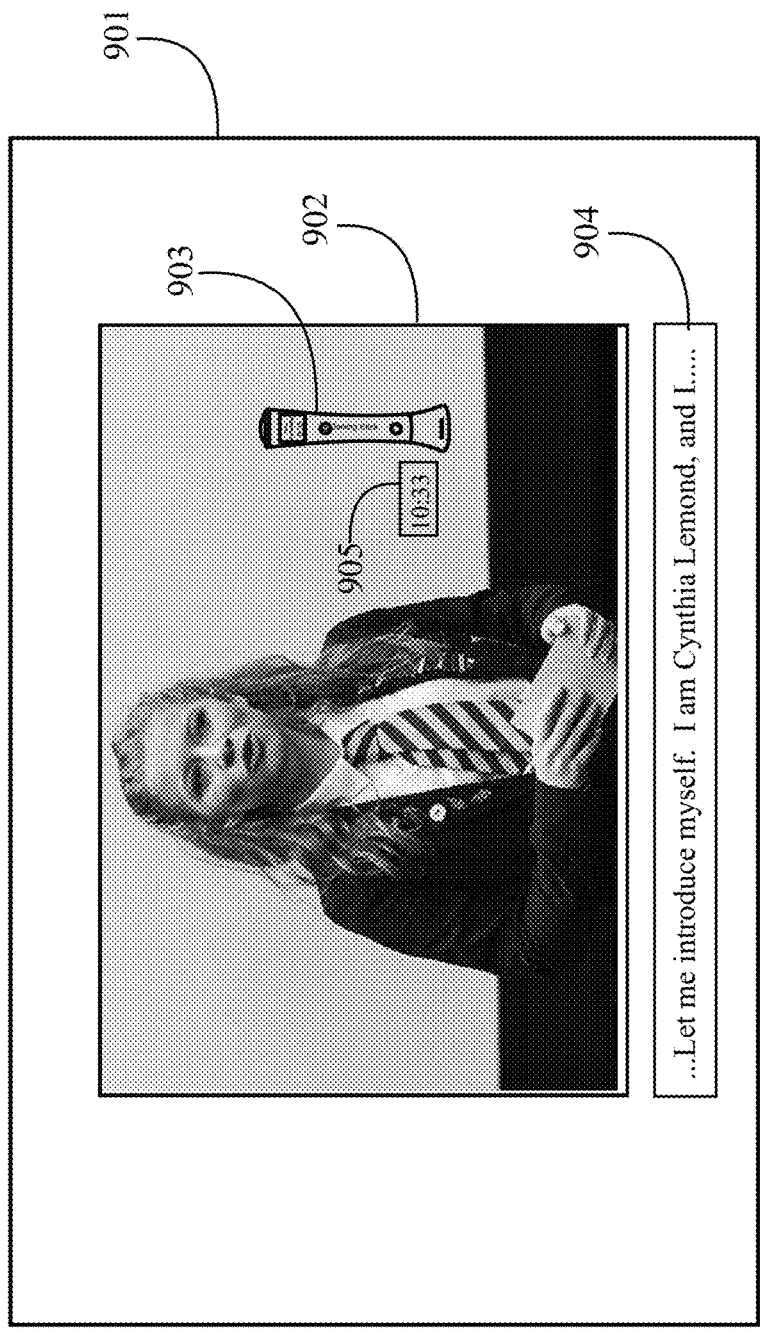
FIG. 9A illustrates a display screen of a platform, displaying a participant of a video conference in an embodiment of the present invention.

FIG. 9A is an illustration of a display screen of a platform used by a conference participant in either an audio or a video conference. FIG. 9A illustrates a participant in a video conference, through a video conferencing application that has been enhanced by talking stick functionality, which might be done, as described above, by a plug-in to the video-conferencing application. A female participant is shown as the current speaker, in a window 902 of display screen 901 of a platform that may be used by the participant shown, or any other participant.

An enhanced feature provided by the talking stick plug-in is a graphic artifact 903, representing a talking stick of the sort described above as a physical electronic device that may be passed from one participant to another. As participants in this video conference are mostly broadly separated geographically, or at least are not in a conference room where a physical device may be passed from one to another, it is not practical that the participants might use a physical Talking stick and pass same from one participant to another. Hence virtual talking stick 903.

In some embodiments of the invention virtual talking stick 903 may be displayed to all or many participants in a video conference. In some embodiments virtual talking stick 903 is displayed only to the participant who is currently entitled to speak, and whose image is therefore displayed in the display screen of all participants. This optional functionality provides for non-speaking participants to not be distracted by a virtual talking stick in the display.

Referring again to FIG. 9A, and assuming this display is only to the current speaker, a field 905 may be displayed to the speaker, with a decrementing time indication of time left to speak. This is the same functionality is in the display window 102 of FIG. 1. Further, field 905 may further be labeled "time to speak", as in FIG. 1, but not necessarily so.

In FIG. 9A an additional field 904 may be provided displaying text derived by speech to text processing code from the real-time speech of the participant that currently has the talking stick. In most embodiments this text may be provided to more than just the current speaker, such as to all, or a substantial part of, all of the participants. IN some embodiments the text may dynamically flow in field 904 as the participant speaks.

In one embodiment the text displayed may be in another language than the language employed by the speaker. This may be accomplished by further software processing by translation software, and in one embodiment the speech to text and language translation may be accomplished in a single processing step.

In one embodiment text provided by voice-to-text may be recorded and organized, associated with participants, and categorized by conference subject, and summaries may be implemented and made available to participants and to other interested parties.

Figure 9B:
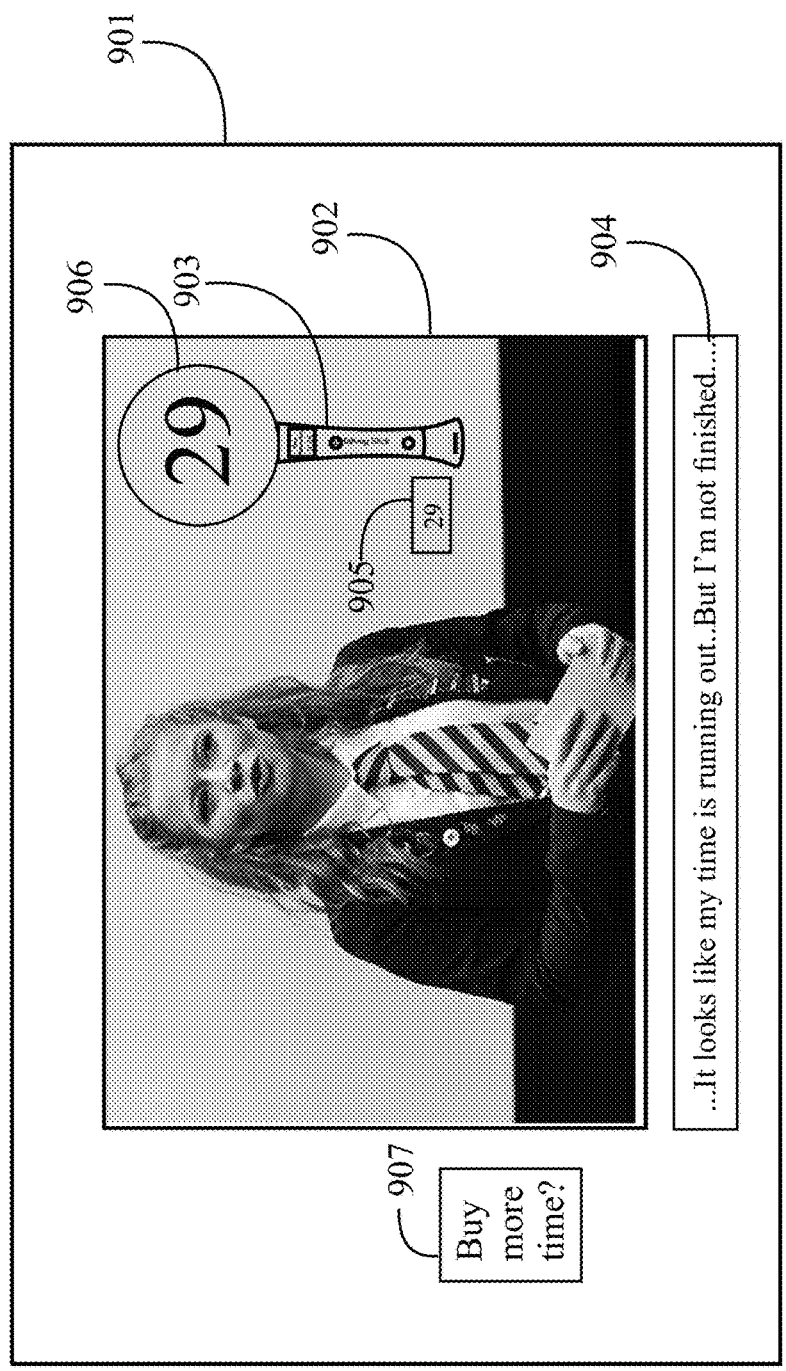
FIG. 9B Illustrates the display screen of FIG. 9A, at a different point in time of a video conference in progress.

FIG. 9B is an illustration of the display screen of FIG. 9A at a time close to an end of the pre-programmed time-to-speak. In an embodiment of the invention, as described also above, as time to speak decrements, there is a pre-programmed point at which the speaker is to be alerted that het time to speak is drawing to a close. In this example that time may be thirty seconds before time runs out.

In FIG. 9B the speaker has 29 seconds left in her time to speak, still decrementing, and at the time point of thirty seconds a balloon 906 appears above virtual talking stick 903, in a fill color yellow, the traditional color for caution. In some embodiments the seconds yet to speak may appear in balloon 906 as well as in field 905, but in a substantially larger font. In some embodiments, at the alert point, in this example thirty seconds, the font size in balloon 906 may be smaller than shown in FIG. 9B, but the font size may increment to larger font as the time decrements second by second, either every second, or every few seconds.

In some embodiments there may be differences in how the decrementing time is displayed, and how the speaking participant may be alerted that her time to speak is about to end. The yellow balloon may be a background color instead. In another embodiment the image in the display may go gradually more transparent, as if the speaker is becoming invisible. The alert display may be a yellow bar, or an additional graphic artifact in the display in color or contrast to indicate to the speaker that the end is near.

In alternative embodiments there may be additional functionality, such as, for example, a pop-up shown as button 907 in FIG. 9B near the end of a speaker's time-to-talk, enabling the speaker to request more time. This link in most embodiments would not be always present but would pop up near the end of the speaker's time. In one embodiment the extra time would be pre-programmed, but in an alternative embodiment the speaker might be provided with an input mechanism to set additional time.

In one embodiment additional time would be deducted from the participant's time to speak in a future round, or in one embodiment the speaker/participant who elects more time may be passed over in a next turn to speak.

Figure 10:
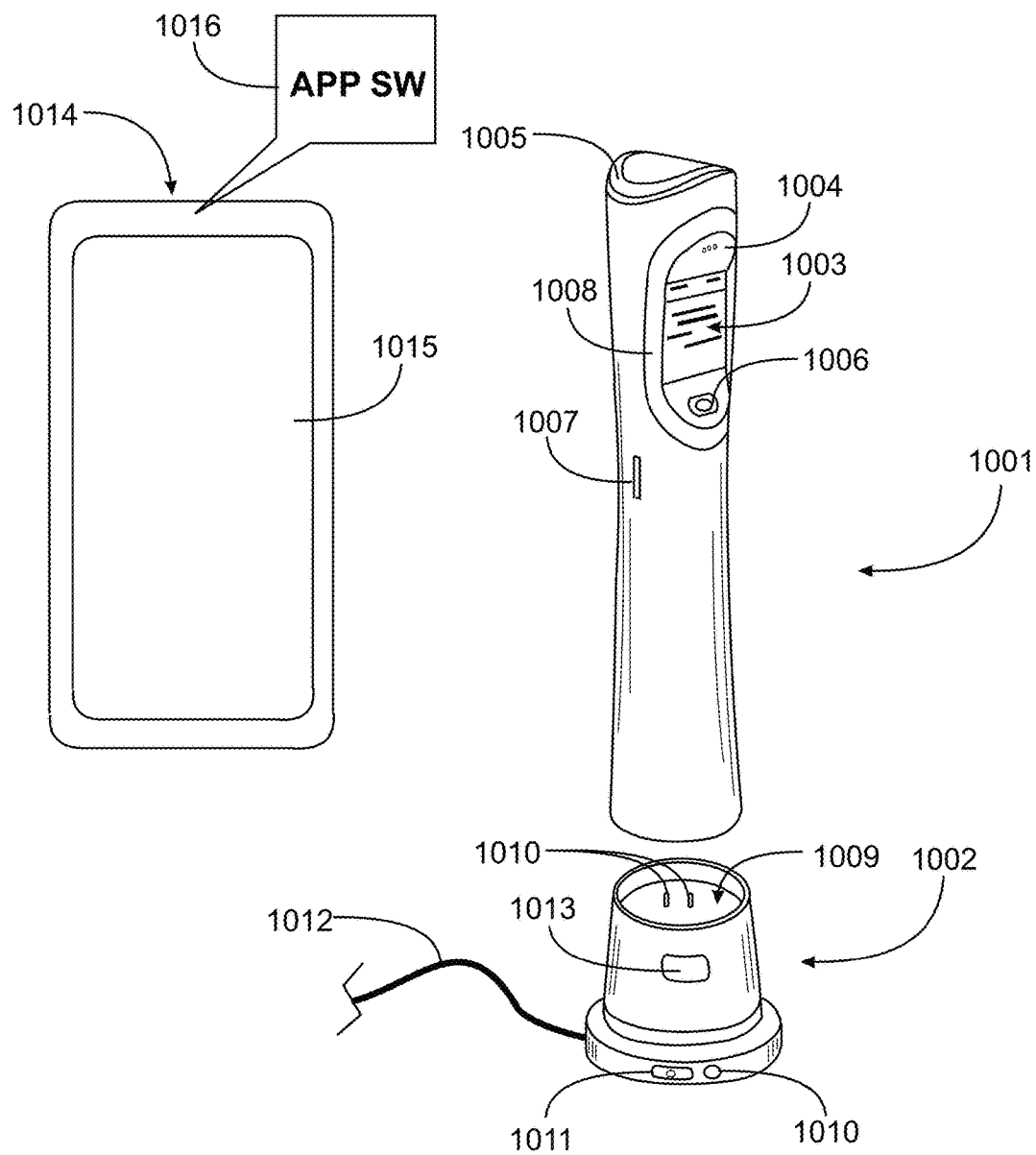
FIG. 10 illustrates an electronic talking stick in an alternative embodiment, with a base and a smartphone.

FIG. 10 illustrates an electronic talking stick 1001 in another alternative embodiment of the invention, similar in many respects to electronic talking stick 101 of FIGS. 1 and 3, but with some significant differences.

Electronic talking stick 1001 has an LED light bar 1005 in a curved aspect at the uppermost portion, which is capable of various colors, including at least red, yellow and green. A bezel 1008 surrounds an LCD display screen 1003, which screen is capable of displaying graphics and text, and may in separate portions indicate power status and battery level. Different messages may be displayed on the screen, such as time-to-speak and topic of discussion. Bluetooth connection status, speaker status, recording status and data capacity remaining may also be displayed. A microphone 1004 is located just above the display in a convenient position for a user.

In this version there is an on-board removable memory in the form of a micro-SD card, for a which a docking bay 1007 is provided. The removable memory card may be used for recording audio in use of the talking stick, and is not the sole memory of the device, which also has on-board memory for storing coded instructions for various operating activity.

A button switch 1006 is located in this example just below the display screen, where it is convenient to a user's thumb when holding the talking stick. The button switch may be usable for on-off, starting a timer, which time may be displayed in decrementing order, and for resetting the device.

A base 1002 has a power-on button 1011 and an LED power indicator 1010. The base is connected in embodiments to a wall plug via an electrical line 1012 to provide power to circuitry connected to pins 1010 located in a receptacle 1009, into which the lowermost portion of the electronic talking stick may be docked. In inserting the talking stick into receptacle 1009 female connectors on the lowermost end of the talking stick engage pins 1010 and enable the battery in the talking stick to be charged. The base unit has an on-board battery which may be charged when the base unit is plugged to a wall outlet, and which is capable of charging the battery of a docked talking stick, even when the base is not plugged in. When the talking stick is not docked in the base, the talking stick may communicate with the base, such as to transfer audio data to the speaker, through wireless circuitry, which may be RF-based.

Figure 11:
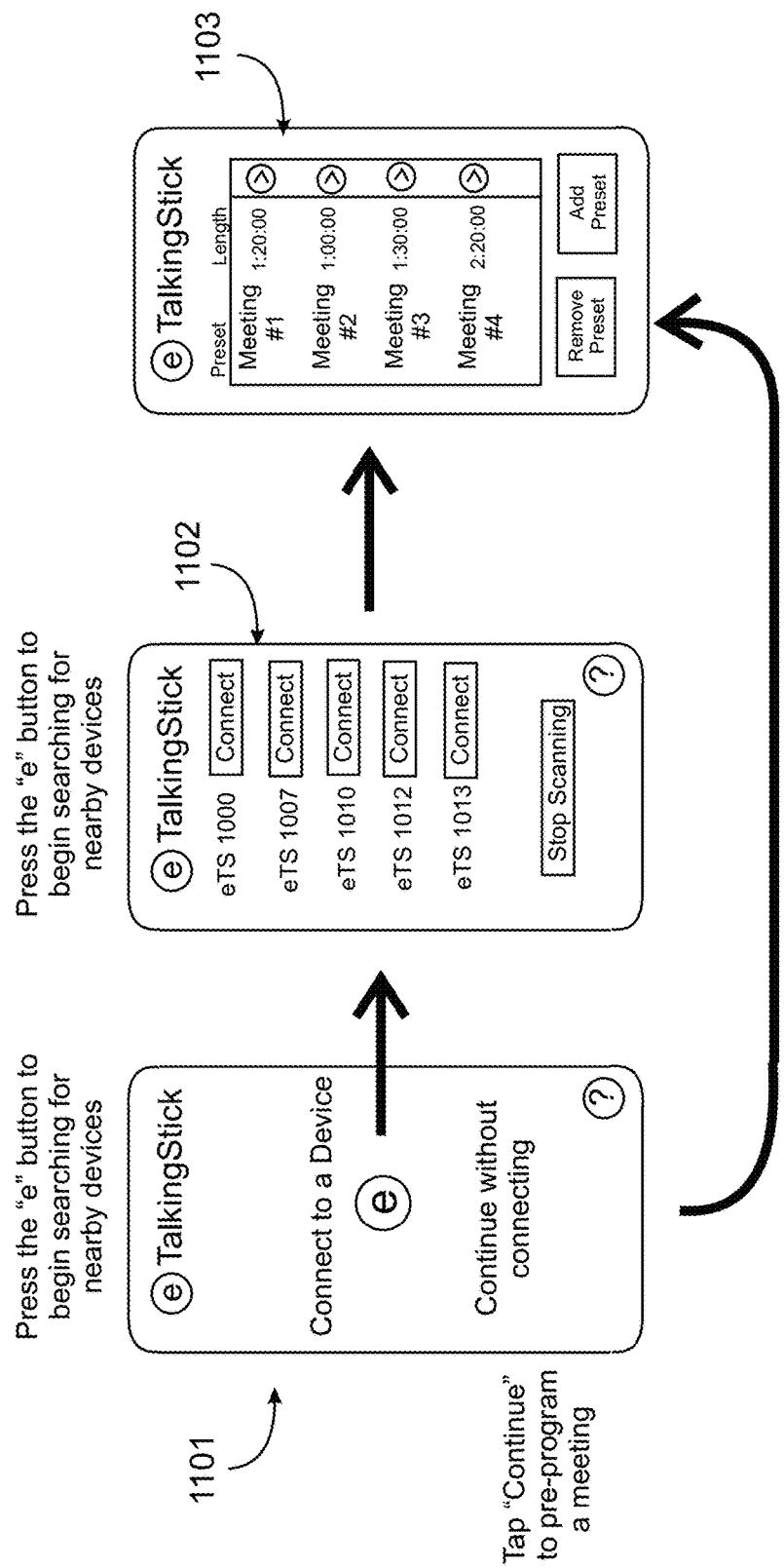
FIG. 11 illustrates a process for connecting a smartphone to a talking stick and configuring meetings in an embodiment of the invention.

Referring again to FIG. 10, a smartphone 1014 with a touchscreen 1015 in this example has a microprocessor or other central processing unit (CPU) executing a software application 1016. Electronic talking stick 1001 has Bluetooth™ circuitry, as does the smartphone, which may pair the smartphone to the talking stick, and to the CPU of the talking stick. Interactive interfaces (not shown in FIG. 10) on the touchscreen display of the smartphone enable a user to, among other tasks:

enter a topic name
manage LED light colors
set speaking time limits start and stop the timer of the talking stick
control colors for warning lights
manage recording configuration and settings
manage speaker settings FIG. 11 illustrates a process for pairing a smartphone with a talking stick and configuring meetings. Interactive interface 1101 may be presented on the touchscreen of the smartphone. Pressing the "e" button starts the process of connecting to a talking stick, or one may alternatively select the interactive text "Continue without connecting" to preprogram one or more meetings.

If the "e" button is pressed interactive interface 1102 appears, and a scanning process identifies talking sticks in the immediate vicinity that are set to pair. A user may select to connect to any talking sticks that is identified in the scan. Once the user connects interactive interface 1103 appears, enabling the user to set up meetings for the talking stick to which the smartphone is paired.

Figure 12:
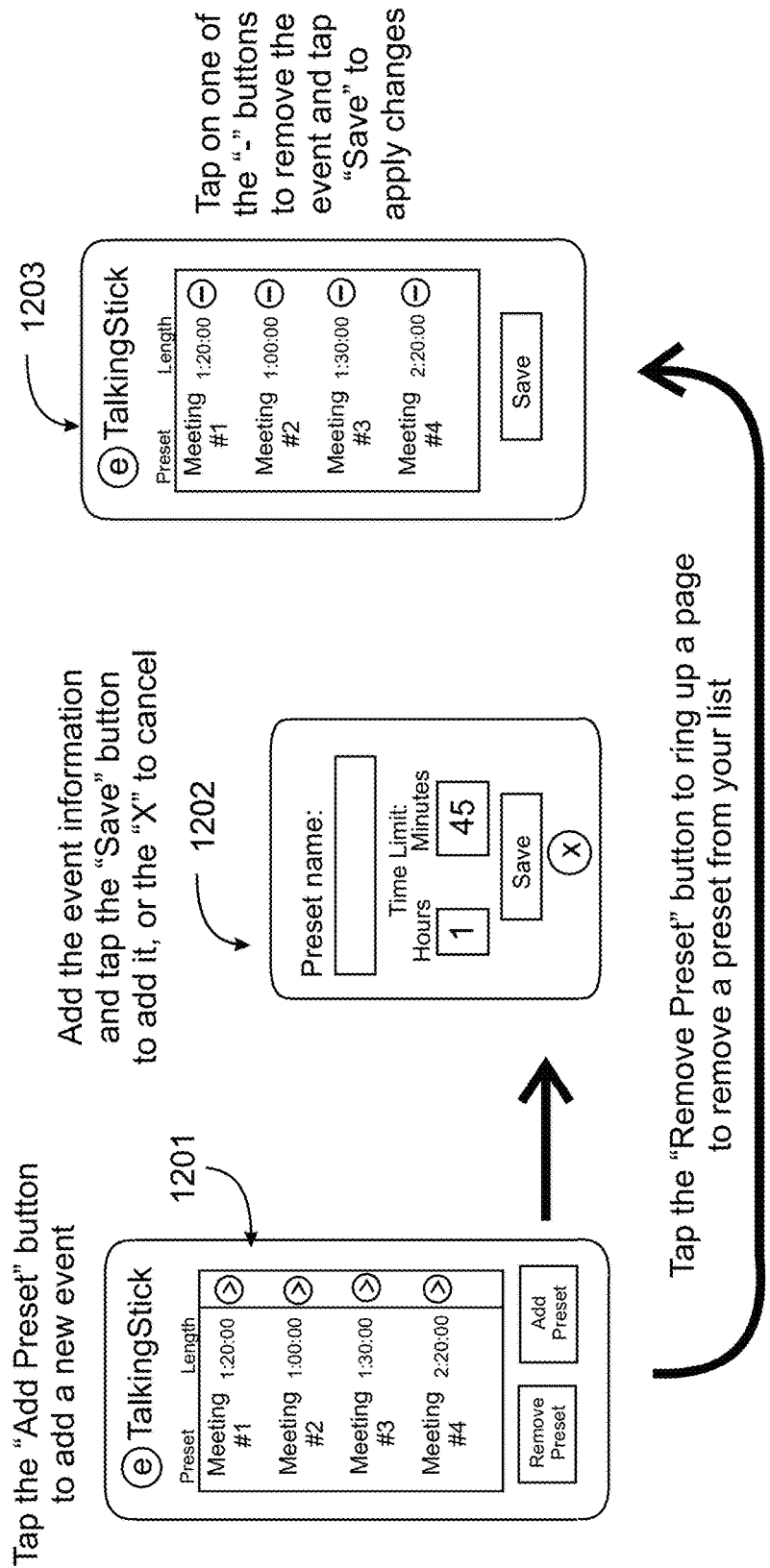
FIG. 12 illustrates an exemplary process for adding or removing an event or meeting in an embodiment of the invention.

FIG. 12 illustrates an exemplary process for adding or removing an event or meeting. An interactive interface 1201 is presented on the smartphone touchscreen listing preset meetings. One may select the "Add Preset" button to add a new event, which causes a new interface 1202 to be displayed. Interface 1202 has a field for entering a name for the new event, and fields for entering time for the event in hours and minutes. After entry the user may tap the "Save" button to save changes, or the "X" button to cancel the input.

In interface 1201 the user may select the "Remove Preset" button, which will cause interface 1203 to display, where the user may remove events and save the changes.

Figure 13:
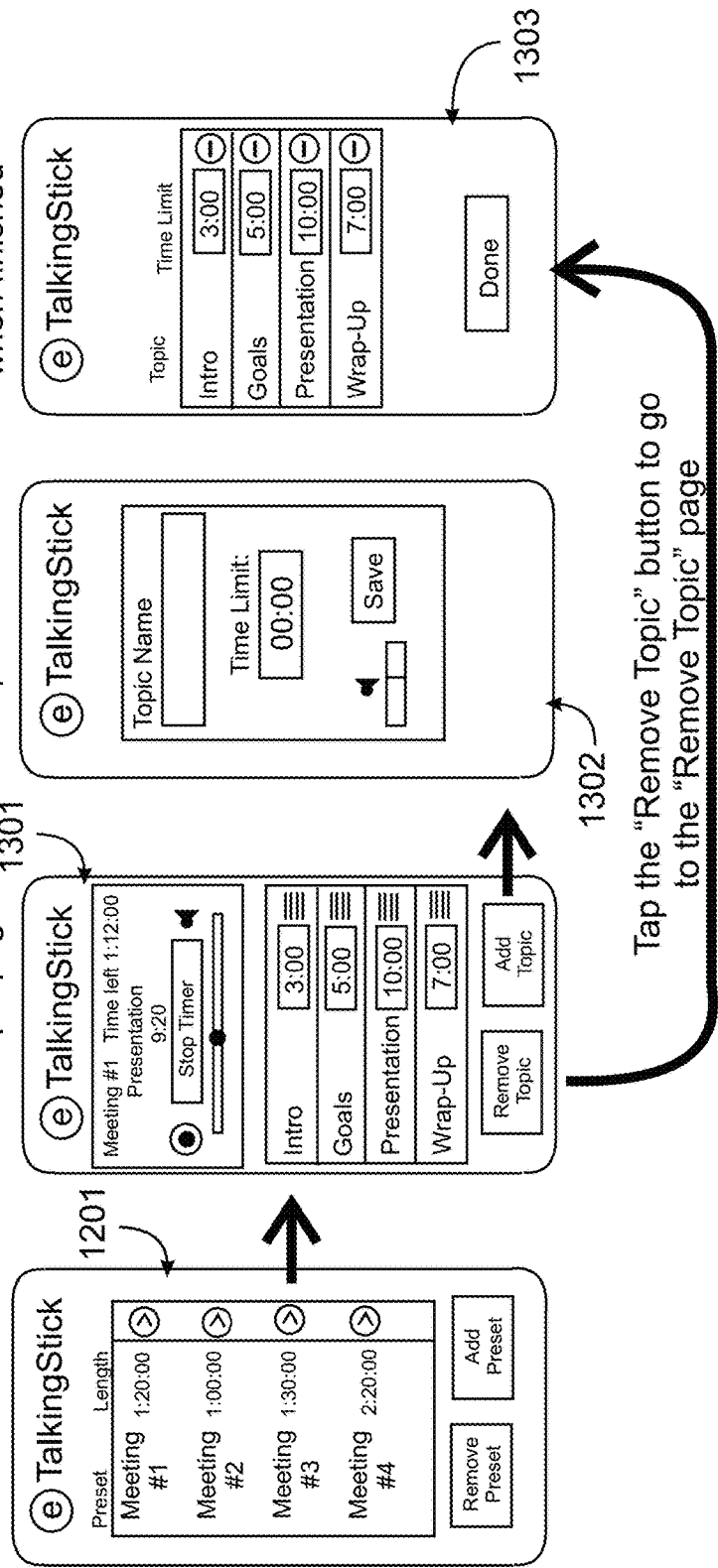
FIG. 13 illustrates an exemplary process for adding and removing topics related to events.

FIG. 13 illustrates an exemplary process for adding and removing topics related to events. Interactive display 1201 is the same interface as in FIG. 12. The user may select an arrow next to a meeting listed, which will display interface 1301. Interface 1301 displays time left for the meeting selected from interface 1201 and has a button to stop the timer. Topics are listed for meeting #1 as Intro, Goals, Presentation and Wrap-up. Selecting the "Add Topic" button in interface 1301 presents interface 1302, where the user may add a topic name in an entry field, set a time limit for the topic, and save the changes, after which the new topic will display in interface 1301.

The user may select "Remove Topic" in interface 1301, in which case interface 1303 will display, where topics may be removed by selecting the "-" button next to a topic, after which the "Done" button may be selected, finishing the process.

Figure 14:
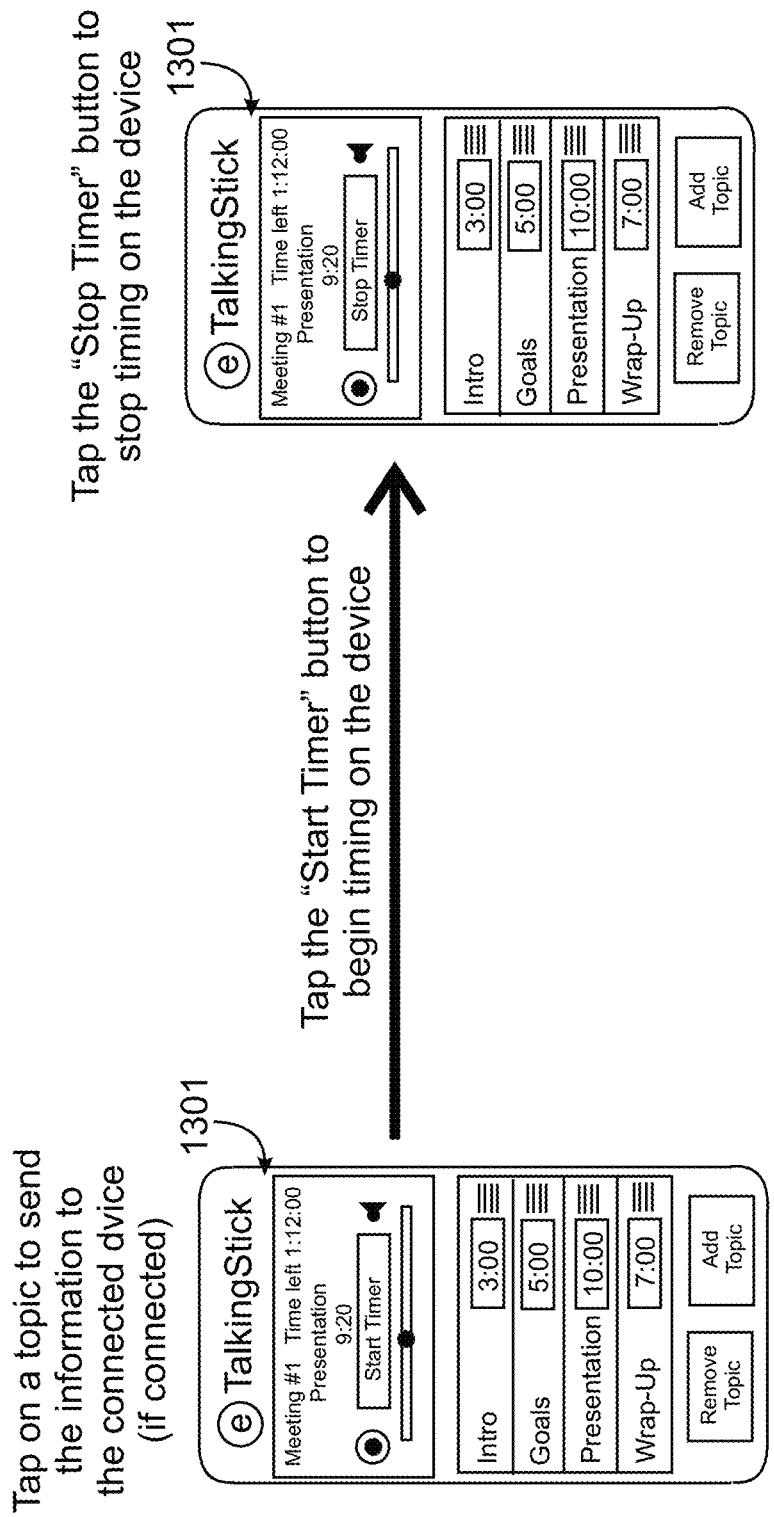
FIG. 14 illustrates an exemplary process for deploying a topic to a device, in an embodiment of the invention.

FIG. 14 illustrates an exemplary process for deploying a topic to a device, in an embodiment of the invention. In interface 1301 of FIG. 13, assuming a device is paired (connected) with the smartphone, a user may tap select a topic to send the information for that topic to the connected device. The user then taps on start timer to start the timer on the connected device, changing the button label to "Stop Timer". The Start/Stop timer button acts as a toggle.

The skilled person will understand that the interactive interfaces shown, and the descriptions of processes using these interactive interfaces presented on a touch screen of a smartphone as a result of executing coded instructions on the smartphone, are exemplary only, and do not represent any specific limitation on how interfaces may be presented to guide a user in engaging the functionality of an electronic talking stick in various embodiments of the invention. There are many alternative ways that the functionality may be achieved.

In addition to the apparatus and methods described above regarding electronic talking stick apparatus and functionality, including methods of use, there may be other applications of the functionality in additional embodiments. For example, in one future embodiment functionality of a talking stick as described in embodiments herein may be applied in stories, in video media, in video games, and in other instances of virtual reality.

In one example communication between two or more persons may be accomplished via a chat application, and functionality of a talking stick may be implemented through chat software in the chat system, managing time to speak, recording transcription, and all of the functionality described above with regard to audio and video conferencing. In another example, individual ones of participants in a conference may be represented as avatars in a virtual reality presentation and may participate through use of head-mounted displays.

Given the descriptions above of the various embodiments, and the systems and technology involved, a person of skill in the art will be aware that there are many more use cases and applications that may be described within the scope of the invention.

Further, each elements and function as described above may be combined with others to provide new embodiments of the invention. The scope of the invention is limited only be the claims below.

The invention claimed is:

1. An electronic talking stick system, comprising:
a hand-held electronic talking stick having a body with an outer casing, a microprocessor executing coded instructions, a data repository, an electronic timer, a display screen, a microphone, a mechanism generating alerts to a user at specific times according to the electronic timer, wireless communication circuitry, and a rechargeable battery powering electrical and electronic components;
a smartphone comprising wireless communication circuitry compatible with the wireless communication circuitry of the hand-held electronic talking stick, and a microprocessor executing an application for managing functionality of the hand-held electronic talking stick; and
a docking bay into which an electronic talking stick may be docked, the docking bay and the electronic talking stick having pins and sockets enabling docking, and wherein, with an electronic talking sick docked, the docking bay recharges the battery of the electronic talking stick, and wherein the docking bay further comprises a speaker and wireless communication circuitry compatible with the wireless communication circuitry of the electronic talking stick, wherein speech of users through the microphone is broadcast by the speaker in the docking bay.

2. The electronic talking stick system of claim 1 wherein execution of the application on the smartphone generates interactive displays on a display screen of the smartphone enabling a user to set and edit a time to talk for a participant in a conference, to set and edit a caution alert time, to enter topics for conferences to be conducted, and to enter time limits for individual conferences.

3. The electronic talking stick system of claim 2 wherein an interactive display provided on the smartphone display by the execution of the application enables wireless connection to different ones of a plurality of electronic talking sticks.

4. The electronic talking stick system of claim 2 wherein one or more interactive displays enable the user to configure individual ones of a plurality of conferences, setting topics, talk times, alert times, and conference times durations.

5. The electronic talking stick system of claim 4 wherein one or more interactive displays enable the user to edit topics, talk times, and alert times for individual ones of the plurality of conferences.

6. The electronic talking stick system of claim 5 wherein interactive displays enable a user to configure individual conferences by entering participants names or other unique identification, and an order for speaking and passing the electronic talking stick.

7. The electronic talking stick system of claim 6 further comprising archiving activity of a conference, including participation and speech of individual participants.

8. The electronic talking stick system of claim 7 further comprising facility for preparing and publishing conference reports.

9. The electronic talking stick system of claim 6 further comprising facility for a conference participant to request additional time to talk.

10. The electronic talking stick system of claim 9 wherein a participant granted additional time to talk gives up time to talk in additional rounds of the conference.

11. The electronic talking stick system of claim 2 wherein the display screen, during a conference wherein a participant is holding the electronic talking stick, displays at least the topic for the conference, and the time counted down by the timer.

12. The electronic talking stick system of claim 11 wherein the display screen additionally displays one or more of power status, battery level, wireless connection status, speaker status, recording status and data capacity remaining.

13. The electronic talking stick system of claim 1 further comprising a removable memory card docked in a card bay, wherein speech of users through the microphone is recorded on the removable memory card.

14. An electronic talking stick system, comprising:
a hand-held electronic talking stick having a body with an outer casing, a microprocessor executing coded instructions, a data repository, an electronic timer, a display screen, a microphone, a mechanism generating alerts to a user at specific times according to the electronic timer, wireless communication circuitry, and a power supply powering electrical and electronic components;
a smartphone comprising wireless communication circuitry compatible with the wireless communication circuitry of the hand-held electronic talking stick, and a microprocessor executing an application for managing functionality of the hand-held electronic talking stick; and
lights enabled to light with different colors, and a mechanism enabled to emit an audible signal, wherein alerts may be either an audible signal generated or a light lit in a particular color;
wherein as the timer times down from the time to talk the light is lit as green as timing begins, changes to yellow at the caution alert time, and to red at the end of tine to talk.

* * * * *